United States Patent
Smith, Jr. et al.

4,110,045
Aug. 29, 1978

[54] ELECTROMAGNETIC WAVE RING RESONATOR

[75] Inventors: Irl Wilson Smith, Jr., Newton; Terry A. Dorschner, Waltham, both of Mass.

[73] Assignee: Raytheon Company, Lexington, Mass.

[21] Appl. No.: 646,308

[22] Filed: Jan. 2, 1976

[51] Int. Cl.² .............................................. G01B 9/02
[52] U.S. Cl. ......................... 356/106 LR; 331/94.5 C; 350/152
[58] Field of Search ................. 356/106 LR; 350/152; 331/94.5 C

[56] References Cited
U.S. PATENT DOCUMENTS

| | | | |
|---|---|---|---|
| 3,382,759 | 5/1968 | Macek | 356/106 LR |
| 3,741,657 | 6/1973 | Andringa | 356/106 LR |
| 3,841,758 | 10/1974 | Gievers | 356/106 LR |

*Primary Examiner*—Vincent P. McGraw
*Attorney, Agent, or Firm*—Richard M. Sharkansky; Milton D. Bartlett; Joseph D. Pannone

[57] ABSTRACT

An electromagnetic wave ring resonator is disclosed wherein means in included for spatially rotating the electromagnetic field distribution of waves resonant therein, such rotation being about the direction of propagation of such waves. With such arrangement the electromagnetic field distribution rotating means provides a phase difference between waves of opposite polarization sense, thereby enabling the waves to resonate with different frequencies. In a four frequency laser gyroscope the electromagnetic field distribution rotating means includes a catoptric arrangement which reduces the loss, scatter and linear birefringence associated with a ring resonator included in such gyroscope.

24 Claims, 6 Drawing Figures

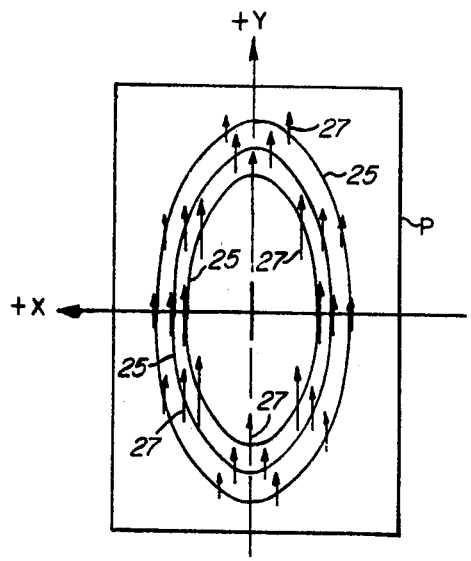
FIG. 2A
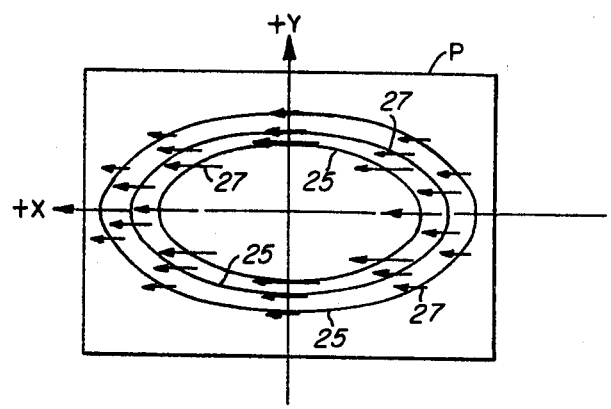
FIG. 2B
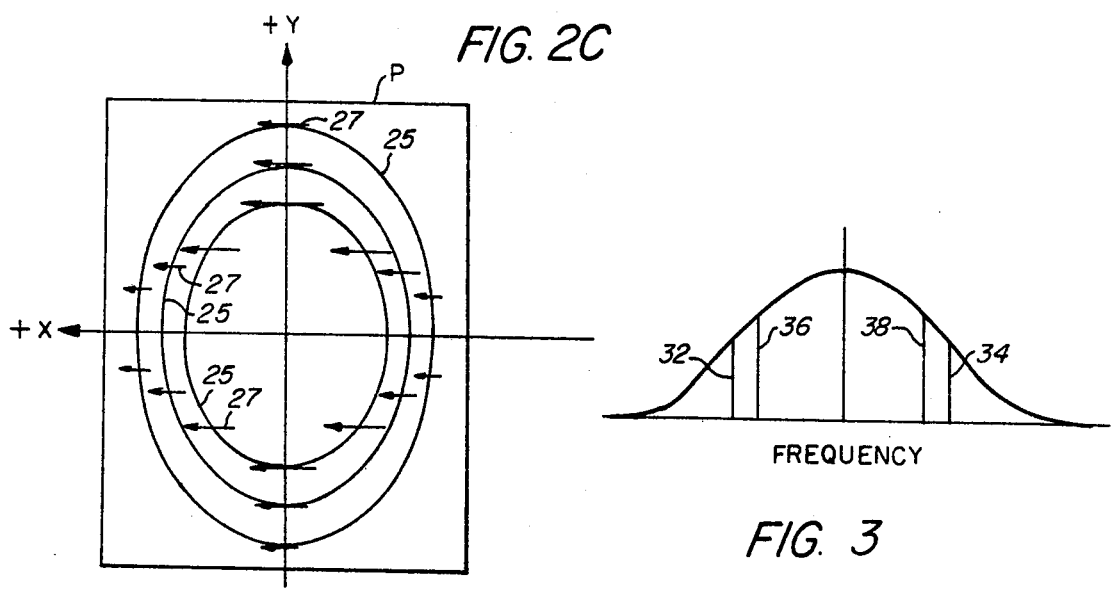
FIG. 2C
FIG. 3

ELECTROMAGNETIC WAVE RING RESONATOR

BACKGROUND OF THE INVENTION

This invention relates generally to electromagnetic wave resonators, and more particularly to electromagnetic wave resonators adapted for use in laser gyroscope apparatus.

As described in U.S. Pat. No. 3,741,657 entitled "Laser Gyroscope," Keimpe Andringa inventor, issued June 26, 1973 and assigned to the same assignee as the present invention, a laser ring resonator supports four optical waves, each one of such waves having a different frequency, one pair thereof traveling in a clockwise direction and the other pair thereof traveling in a counterclockwise direction. The optical pathlengths of the waves are such that the pair of frequencies of the waves traveling in one direction, say the counterclockwise direction, is positioned between the frequencies of the waves traveling in the opposite, or clockwise, direction.

Having established this frequency relationship, movement of the laser resonator, for example by rotation of the system about an axis perpendicular to the optical path, produces frequency shifts of the pair of waves propagating in one direction through the laser which are opposite to frequency shifts of the waves moving in the opposite direction through the laser. This, in turn, produces changes in the frequency separation between the lower frequencies of each of said pairs. The difference between such changes is, substantially, a linear function of the rate of said rotation and the relative sense of such difference is indicative of the direction of said rotation.

As described in the referenced U.S. Pat. No. 3,741,657, such frequency separation results from disposing in the path of the waves a polarization dispersive structure which comprises a Faraday rotator and a crystal rotator. The crystal rotator is an anisotropic medium which restricts the type of polarization of the waves which may be supported in the ring laser to substantially circular polarization and also provides a different optical pathlength for right-hand sense circularly polarized waves than for left-hand sense circularly polarized waves. The Faraday rotator is a nonreciprocal device and provides different time delays to waves of each polarization sense passing in the laser ring in one direction from those of such polarization sense passing in the opposite direction. The combination of the crystal rotator and Faraday rotator provides the four frequency relationship discussed above.

While the described polarization dispersive structure has been found satisfactory in many applications, the use of a crystal rotator increases loss and scatter imparted to the propagating waves and introduces linear birefringence to the ring resonator thereby reducing the accuracy of a laser gyroscope using such polarization dispersive structure.

SUMMARY OF THE INVENTION

According to the present invention an electromagnetic wave ring resonator includes means for spatially rotating the electromagnetic field distribution of electromagnetic waves resonant therein about the direction of propagation of such waves. With such arrangement such rotating means provides a phase difference between waves of opposite polarization sense thereby enabling such waves to resonate in such resonator with different frequencies.

In a preferred embodiment a laser ring resonator includes a plurality of reflectors positioned in the path of the laser to spatially rotate the electromagnetic field distribution of the laser waves resonant therein and thereby provide a predetermined phase alteration to the waves resonant therein. Such phase alteration correspondingly alters the resonant frequency of each one of such waves in the ring resonator without requiring a crystal rotator in such path to alter the optical pathlength of such laser. Since the phase alteration sense is opposite for opposite senses of circular polarization, such arrangement enables waves of opposite polarization sense to resonate at separate frequencies. The reflectors are preferably oriented to provide a $\pi$ radian phase difference between right and left-hand circularly polarized waves.

BRIEF DESCRIPTION OF THE DRAWINGS

Other and further features and advantages of the invention will become apparent as the description thereof progresses, reference being made to the accompanying drawings wherein:

FIGS. 2A–2C are sketches useful in understanding the invention;

FIG. 3 illustrates a diagram of operating characteristics of the system illustrated in FIG. 1.

DESCRIPTION OF THE PREFERRED EMBODIMENTS

Figure 1:
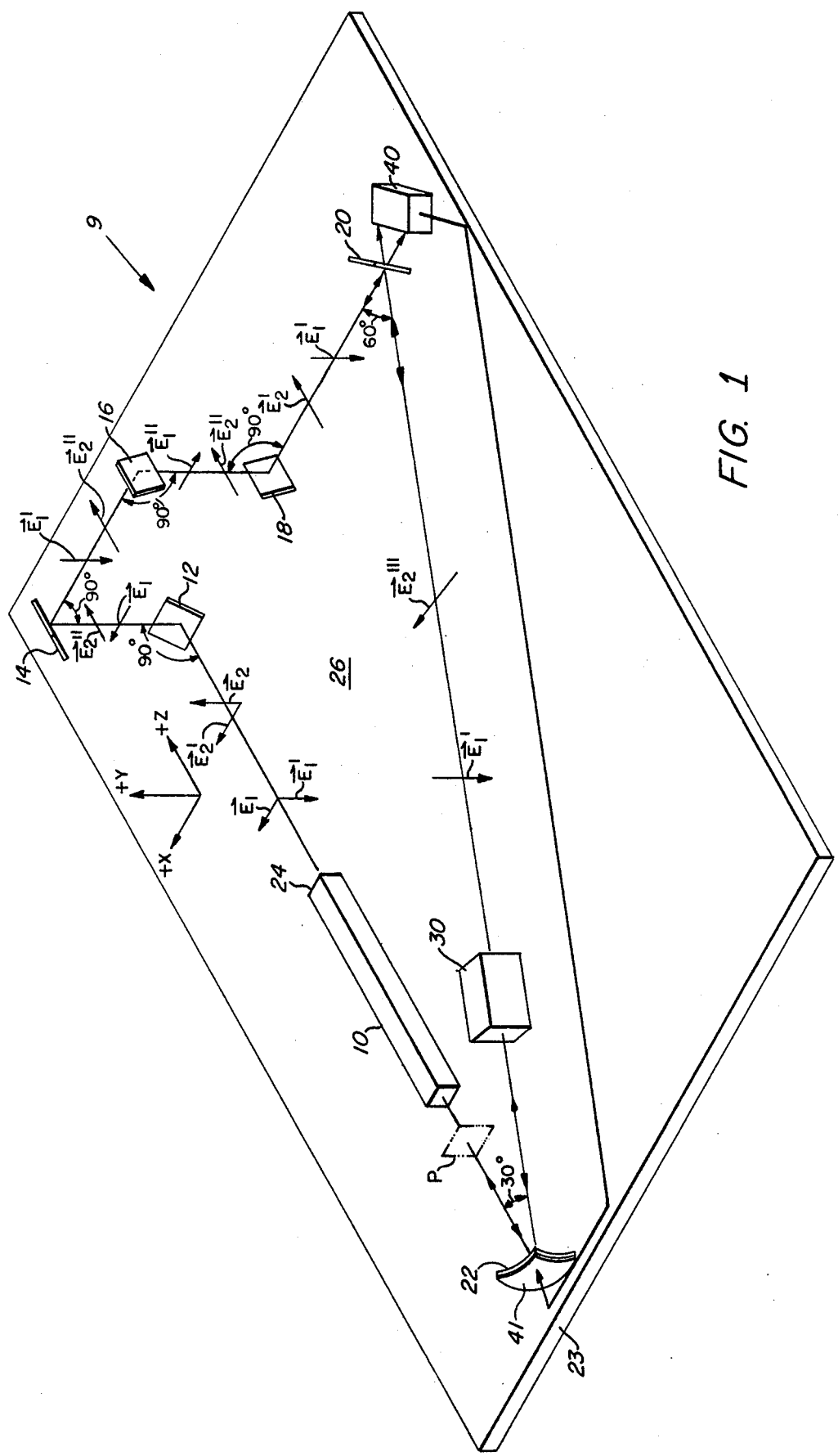
FIG. 1 illustrates a diagrammatic view of a ring resonator embodying the invention.

Referring now to FIG. 1 there is shown a laser gyroscope system 9 having a laser amplifier medium 10 (here a helium-neon laser medium having a gas mixture: 8 $^3$He + 0.48 $^{22}$Ne + 0.52 $^{20}$Ne. A ring laser resonator includes an even number of reflectors, here six reflectors 12, 14, 16, 18, 20, 22 (suitably mounted, by means not shown, to the surface of a platform 23) which produce a ring path for the laser beams. It is here noted that, as will be described later in connection with FIG. 4, the desired ring path may be produced by as few as four properly positioned reflectors. However, the six reflector system will first be discussed in order to establish the principle of operation of the laser gyroscope system. Considering the laser beam produced at end 24 of the laser amplifier medium 10, such beam travels along the +Z direction (i.e. along the longitudinal axis of the laser amplifier medium 10) through an isotropic medium, preferably substantially free space, and is first reflected by reflector 12. The reflector 12 has its reflecting surface oriented such that the laser beam is reflected vertically a distance $d_1$ along the +Y direction to reflector 14. Reflector 14 has its reflective surface oriented such that the beam incident thereon becomes reflected horizontally a distance $d_2$ along the −X direction to reflector 16. Reflector 16 has its reflective surface oriented so that the beam incident thereon becomes reflected vertically a distance $d_1$ along the −Y direction to reflector 18. Reflector 18 has its reflective surface oriented so that the beam incident thereon becomes reflected horizontally a distance $d_3$ along the −X direction to reflector 20. It is here noted that the beam passing from end 24 of laser amplifier medium 10 to reflector 12 and the beam passing from reflector 18 to reflector 20 are orthogonal to each other and define a common horizontal plane 26. The surface of the platform 23 is disposed in a plane parallel to the horizontal plane 26. Therefore, the beams passing from reflector 12 to reflector 14 to reflector 16 to reflector 18 are disposed in a vertical plane. Continuing, reflector 20 has its reflective surface oriented so that the beam incident thereon is reflected to reflector 22, the incident beam and the reflected beam being disposed in the horizontal plane 26 and having an included angle here of 60°. Reflector 22, here having a concave surface to aid in concentrating the laser beam through the laser amplifier medium 10 (i.e. to aid in establishing a resonant transverse mode), has its reflective surface oriented so that the beam incident thereon is reflected again along the longitudinal axis of the laser amplifier medium 10, as shown, such incident and reflected beams being disposed in the horizontal plane 26 and having an included angle here of 30°. The distance between reflectors 22 and 12 along the $+Z$ axis is $d_4$.

It is here noted that, for purposes of explanation, the following description neglects the effect of 180° phase changes imparted to an electric field component upon reflection by a reflector. Such consideration is appropriate here because the ring resonators described herein include an even number of reflectors in the path of the resonant waves and hence the effect of such phase changes cancel upon traversal of the waves through the ring resonator.

Considering the beam produced at end 24 of laser amplifier medium 10 and traveling along the $+Z$ axis to have an electric field component $E_1$, disposed along the $+X$ axis, such electric field component remains along the $+X$ axis after reflection by reflector 12, then becomes oriented along the $-Y$ axis to the electric field component $E_1''$ because of reflector 14, then becomes oriented along the $-X$ axis because of reflector 16, then becomes oriented along the $-Y$ axis because of reflector 18 and remains so oriented when it returns to end 24. The effect of the reflectors 12-22 on the orientation of such electric field component $E_1$ is to rotate into such component $-90°$ about the beam axis (i.e. the $+Z$ axis) to the electric field component $E_1'$.

Considering now the beam produced at the end 24 of laser amplifier medium 10 and traveling along the $+Z$ axis to have an electric field component, $E_1$ disposed along the $+Y$ axis, such component first becomes oriented along the $+Z$ axis (to electric field component $E_2''$) because of reflector 12, remains oriented along the $+Z$ axis after reflections by reflectors 14, 16 and 18, then becomes disposed in the X-Z plane at a $-30°$ angle with respect to the $+X$ axis (to electric field component $E_2'''$) and then, after reflection by reflector 22, becomes oriented along the $+X$ axis at the end 24 to electric field component $E_2'$. The effect of the reflectors 12-22 on the orientation of such electric field component $E_2$ is to rotate such component $-90°$ about the beam axis. The effect of a passage around the ring may thus be symbolized:

$$E_1 \,!\, E_1' = -E_2$$

$$E_2 \,!\, E_2' = E_1$$

The effect of reflectors 12, 14, 16, 18, 20, 22 then is to rotate the electromagnetic field distribution of waves passing around the ring resonator $-90°$ in the plane orthogonal to the optical path of such waves. The electromagnetic field distribution refers to both the intensity and direction (i.e. polarization or electric field vector) of an electromagnetic wave at a point in space. For example, if the electromagnetic field distribution of waves produced by the laser amplifier medium 10 has, in the plane P, isophotes (lines 25 of equal intensity) which are elliptically shaped having vertical major axes and vertically oriented electric field components 27 as represented in FIG. 2A, the effect of the reflectors 12-22 is (1) to rotate the electromagnetic field distribution so that such electric field components and the major axis of the isophotes are oriented horizontally (as shown in FIG. 2B) and (2) to distort such distribution because of diffraction and because of the concave surface of reflector 22, as shown in FIG. 2C. It is noted that in order for waves to resonate, that is, be a stable mode of the ring resonator, such waves, after passing once around such resonator, must return to a given point with their original electromagnetic field distribution. However, in general, neither the shape of the isophotes nor the polarization (electric field direction) in a given plane will remain unchanged in such plane after passing once around the resonator. Waves having a frequency which is capable of being a resonant frequency will acquire an intensity distribution for which the diffraction of the waves and the focusing of reflector 22 are balanced so that the waves which are resonant have the same intensity distribution upon transversal of the resonator. However, only for circularly polarized waves is the polarization also able to return to its initial state after one traversal. Thus, the only self-consistent electromagnetic field distribution which may exist in the resonator is that of waves having circular polarization. The isophotes of such resonant waves will acquire a shape which enables support of such circularly polarized waves in the ring resonator. Further, if the circular polarization of such waves has a right-hand sense polarized component, i.e.

$$E_r = [E_1 + E_2 e^{i\pi/2}] e^{-i\omega t}$$

the effect of the reflectors 12-22 is to transform such component into $$E_r' = [E_1' + E_2' e^{i\pi/2}] e^{i2\pi L/\lambda} e^{-i\omega t} = [-E_2 + E_1 e^{i\pi/2}]$$
$$e^{i2\pi L/\lambda} e^{-i\omega t} = e^{i\pi/2} e^{i2\pi L/\lambda} E_r$$

where L is the length of the path around the ring, measured along the beam axis.

If the circular polarization of such waves has a left-hand sense polarization component, i.e.

$$E_l = [E_1 + E_2 e^{-i\pi/2}] e^{-i\omega t}$$

the effect of a passage around the ring is to transform it to $$E_l' = [E_1' + E_2' e^{-i\pi/2}] e^{i2\pi L/\lambda} e^{-i\omega t} = [-E_2 + E_1$$
$$e^{-i\pi/2}] e^{i2\pi L/\lambda} e^{-i\omega t} = e^{-i\pi/2} e^{i2\pi L/\lambda} E_l$$

The relative phase difference between the left and right-hand components is, then, $$[e^{i\pi/2} e^{i2\pi L/\lambda}] / [e^{i2\pi L/\lambda} e^{-i\pi/2}] = e^{+i\pi} \text{ or } 180°$$

Further, it should be noted that the effect of reflectors 12-22 is to alter the phase of the wave passing through the resonator, here $+\pi/2$ for right-hand sense polarized waves and $-\pi/2$ for left-hand sense polarized waves. Because the optical path-lengths of the waves in the resonator are the same, as neither wave passes through a medium (here neglecting the Faraday rotator 30 in order to understand the function of reflectors 12-22) to alter such optical pathlength, the phase alteration provided by such reflectors 12-22 correspondingly alters the resonant frequencies of such waves, the resonant frequencies of the waves of different sense of polarization altering oppositely. The result is that the waves of right-hand sense polarization will have a resonant frequency different from the resonant frequency of the left-hand sense polarized waves. This effect may be understood by considering a right-hand sense polarized wave to be represented as:

$$E_R = R_e[e_R] = X \cos(\beta S - \omega t) - Y \sin(\beta S - \omega t)$$

where X, Y and Z are orthogonal unit vectors, S being measured along the direction of propagation of the wave, $\omega$ being the angular rotational rate of the electric field vector and $\beta = 2\pi f/c = 2\pi \lambda$ where $f$ and $\lambda$ are the frequency and wavelength, respectively, of such wave and $c$ is the velocity of light.

In order for such wave to resonate in a resonator, without an electromagnetic field distribution rotation means, having optical pathlength L, $\beta$ and L must satisfy the following: $\beta L = 2n\pi$ (where $n$ is an integer) and hence the resonant frequencies of such waves are $$f_o = nc/L$$

The effect of rotating the electric field vector of such a wave in the manner described above in connection with FIG. 1 is, as described, to change the phase of such wave and hence such phase altered wave may, for right-hand sense polarization, be represented by $$E_R' = Re[e_R'] = X \cos(\beta S - \omega t + \pi/2) - Y \sin(\beta S - \omega t + \pi/2)$$

For resonance, $\beta$ and L must then satisfy $$\beta L + \pi/2 = 2n\pi, \text{ and}$$

therefore the resonant frequencies of such wave have been changed to $f_r'$ where $$f_r' = c/2\pi L (2n\pi - \pi/2)$$

Considering left-hand sense polarized waves, it follows that such resonant frequency will change, because of the electric field rotation described above, to $$f_l' = c/2\pi L (2n\pi + \pi/2)$$

In summary, then, a phase alteration of $\phi$ (radians) of opposite sense for opposite polarization senses correspondingly separates the resonant frequencies of opposite sense polarized waves by $$\Delta f = c/2\pi L (2\phi)$$

It further follows that such reflectors 12-22 have a reciprocal effect; that is, the phase delay will be effected for waves exiting at end 24 of the laser amplifier medium 10 along the +Z axis, (i.e. clockwise) and for waves entering such end 24 along the −Z axis (i.e. counterclockwise).

A conventional solid medium Faraday rotator 30, here including a fused silica window with a conventionally mounted permanent magnet (not shown) is suitably mounted to the platform 23 by any convenient means (not shown). Such Faraday rotator 30 is a non-reciprocal device and produces a phase delay for waves of either circular polarization sense traveling clockwise which is different from that for waves of similar polarization traveling counterclockwise. The combination of the reflectors 12-22 and the Faraday rotator 30 is such that the ring resonator supports waves having frequencies of oscillation as shown in FIG. 3, the two waves 32, 34 traveling clockwise and the two waves 36, 38 traveling counterclockwise, the two waves traveling clockwise having opposite sense circular polarization and the two waves traveling counterclockwise also having opposite sense circular polarizations. These frequencies are shown as positive or negative differences from the center of maximum gain frequency of the laser amplifier medium 10.

Mirror 20 is here partially transmissive (typically less than 0.1 percent) to enable a portion of the waves traveling clockwise and the waves traveling counterclockwise to pass to the stabilization system and utilization device 40. Alternatively, specular reflections from the surfaces of the various components in the resonator may be directed, by any conventional optical means (not shown), to such stabilization system and utilization device 40. Here such device 40 includes a differential amplifier (not shown) to produce an electrical signal for a piezoelectric element 41 suitably affixed to the reflector 22 to control the position of reflector 22 thereby to maintain the four frequencies symmetrically about the center maximum gain frequency curve of the laser amplifier medium 10 and also includes counters (not shown) for providing an indication of the rotational rate of the laser resonator about the gyroscope axis. Such stabilization system and utilization device 40 is described in the referenced U.S. Pat. No. 3,741,657.

It is here noted that two different isotopes of neon are used in the laser amplifier medium 10, i.e. $^{22}$Ne and $^{20}$Ne. Two different isotopes of lasing medium are provided so that each one of the four waves interacts with a different set of the atoms of the lasing medium, i.e. atoms with different velocities, when the cavity length is stabilized to maintain the four frequencies symmetrically about the center maximum gain curve of the laser amplifier medium. In this regard, the $^{20}$Ne isotope constitutes 52% of the neon atoms in order to compensate for its lesser atomic weight. That is, in order for the maximum gain associated with a composite laser medium to be half way between the resonant frequencies associated with the two isotopes, a greater percentage of $^{20}$Ne is used (i.e. 52%) as compared with $^{22}$Ne (i.e. 48%). With this arrangement the different sets of atoms interacting with corresponding ones of the four waves will have maximum isolation from each other.

The orientation of the gyroscope axis is along the vector G. Such vector G is calculated by the following line integral:

$$G = \oint r \times dr$$

where dr is the direction of travel along the path at a point on such path and r is the position vector of such point. Considering the ring resonator described in FIG. 1, it is noted that such waves in the resonator pass in two orthogonal planes, i.e. the horizontal plane 26 and the vertical plane. The area enclosed in the horizontal plane is $A_1 = \frac{1}{2}(d_2 + d_3)d_4$. The area enclosed in the vertical plane is $A_2 = d_2d_1$. The gyroscope axis then is along the vector G where $$G_1 = [+A_1Y - A_2Z]$$

Figure 4:
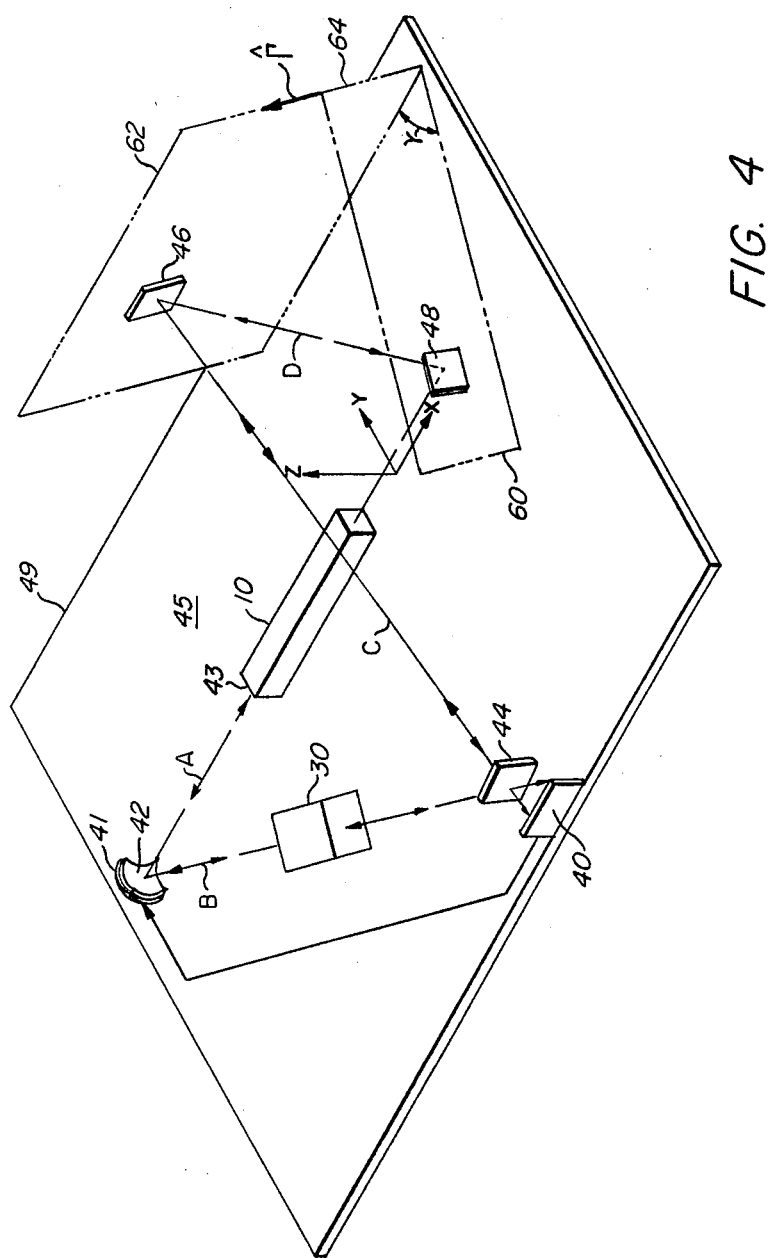
FIG. 4 illustrates a diagrammatic view of an alternative embodiment of a ring resonator according to the invention.

Referring now to FIG. 4 a laser ring resonator here includes laser amplifier medium 10 and four reflectors, i.e. reflectors 42, 44, 46, 48 positioned as shown to enable such resonator to support waves having circular polarization and so that right-hand sense circularly polarized waves have a different phase alteration than the left-hand sense circularly polarized waves, such laser amplifier medium 10 and reflectors 42–48 being suitably mounted by conventional means (not shown) to a platform 49. A Faraday rotator 30 is included to enable such laser resonator to support circularly polarized waves having four different frequencies thereby enabling such apparatus to be used as a four frequency laser as described in connection with FIG. 1. Also, stabilization system and utilization device 40 is included to control the position of reflector 42 (such reflector 42 having a piezoelectric element 41 mounted thereto) by responding to the portion of the waves passing through reflector 44, as discussed in connection with FIG. 1.

It is noted that the laser waves incident on and reflected by reflector 42 (here having a concave surface) are disposed in a plane 45 parallel to the plane of the platform 49. Considering the waves produced at the output of end 43 of laser medium 10, reflector 44 directs the beam incident thereon out of the plane 45 to reflector 46. Reflector 46 directs the beam incident thereon to reflector 48, the latter reflector redirecting such beam along the longitudinal axis of the laser amplifier medium 10 in the plane parallel to the plane of the platform 49 (as shown). That is, segments A and B are disposed in the plane parallel to the plane of the platform 49 and segments C and D are disposed in a plane which intersects the plane of platform 49.

The reflectors 42–48 are oriented to rotate the electromagnetic field distribution of the waves resonant in the ring laser $-\pi/2$ radians about the direction of propagation of such waves as such waves traverse the ring resonator. In order to determine the proper orientation of such reflectors it may be helpful to analyze the reflections produced by pairs of reflectors 42–48. First, considering reflectors 46 and 48, it should be noted that the surfaces of such reflectors are disposed in two intersecting planes, 60, 62, (shown in phantom) respectively. Such planes intersect along a dihedral axis 64 and form a dihedral angle $\gamma$. The dihedral axis is disposed along the unit vector $\Gamma$. As is known, two successive reflections of an image are equivalent to a rotation of such image through an angle $2\gamma$ about the dihedral axis formed by the intersecting planes in which the surfaces of such reflectors are disposed. That is, if the normals to the surfaces of the reflectors are $n_1$ and $n_2$, respectively, $$\Gamma \sin\gamma = n_1 \times n_2$$

Referring again to FIG. 4, reflectors 46, 48 are oriented so that the waves passing in segment C of the ring resonator are, after reflection by such reflectors 46, 48, directed along the longitudinal axis of the laser medium 10 when such waves pass in segment A (between reflectors 42 and 48) of such resonator (as shown). With such orientation of reflectors 46, 48 the electromagnetic field distribution of waves in segment C will, in segment A, be rotated by such reflectors $2\gamma$ degrees about the unit vector $\Gamma$. Similarly, a dihedral angle and axis direction is associated with reflectors 42 and 46, and the electromagnetic field distribution of waves in segment A will, in segment C, be additionally rotated in accordance with such angle and axis direction. In order to effectuate a $-\pi/2$ radian rotation of the electromagnetic field distribution about the direction of propagation thereby to provide a $\pi$ radian phase difference between right and left-hand circularly polarized waves, such reflectors 42–48 may have the following orientations:

| Reflector | Direction Cosine of Normal to Surface of Reflector | | |
|---|---|---|---|
| | X Axis | Y Axis | Z Axis |
| 42 | 0.866413 | −.499328 | 0.0 |
| 44 | .003688 | .999298 | .037273 |
| 46 | −.209766 | −.722611 | −.658659 |
| 48 | −.769676 | +.164503 | +.616877 |

It is noted that with such orientation reflectors 42 and 44 rotate the electromagnetic field distribution of propagating waves of one circular polarization sense −4.300 degrees and reflectors 46, 48 rotate the electromagnetic field distribution of such waves −85.700°, the total rotation being −90°.

In such configuration, segment A is here 15.7 centimeters (cm.).

The optical pathlength around the ring resonator is here 50 cm.. Therefore, because the intermode spacing for resonant modes (for waves of a particular polarization), $\Delta\nu$, is given by $\Delta\nu = c/1$, where c is the velocity of light and 1 is the optical pathlength. $\Delta\nu$ here equals 600 MHz. Because the reflectors 42–48 are arranged to provide a 180° phase difference between oppositely polarized waves, the frequency separation between such waves of opposite polarization is 300 MHz, that is, half the intermode spacing, i.e. $\Delta\nu/2$. It is noted that the 180° phase difference provides maximum separation between such oppositely polarized waves. Further, such separation varies from zero to such maximum as the phase difference varies from 0° to 180°. As the phase difference increases from 180° to 360° the separation correspondingly varies from such maximum back to zero.

It is now readily apparent from the foregoing that the catoptric arrangement used to rotate the electromagnetic field distribution of the waves propagating through the ring resonator to establish circularly polarized waves of opposite polarization sense, each having a different resonant frequency, reduces the loss and scatter associated with the resonator when compared to an arrangement which includes an anisotropic crystal rotator to establish such different resonant frequency circularly polarized waves. Further, such catoptric arrangement reduces the amount of linear birefringence in the resonator by removing the anisotropic crystal rotator and hence reduces the degree of ellipticity resulting therefrom on the propagating waves as compared with such anisotropic crystal rotator. Misalignment in the optic axis of of such rotator may give rise to an undesirable residual ellipticity. Such residual ellipticity causes undesirable instabilities in a ring resonator having such crystal rotator. The catoptric system herein described has thereby effectively eliminated this source of residual ellipticity and therefore reduces this instability. Further removal of the anisotropic medium of the crystal rotator eliminates the Fizeau-Fresnel drag effect on waves passing through such medium. Still further, the gain of the resonator is improved by elimination of the loss attributable to the two relatively lossy anti-reflection coatings generally used on the surfaces of a crystal rotator.

Having described preferred embodiments of the invention, it is now evident that other embodiments incorporating these concepts may be used. For example, other lasing media including other mixtures of neon isotopes may be used for the laser amplifier medium 10. It should therefore be clearly understood that the details of such embodiments are set forth by way of example only and it should be understood that it will now be readily apparent to those of skill in the art that various changes in form and detail thereof may be made therein without departing from the spirit and scope of the invention as defined by the appended claims.

What is claimed is:

1. In combination:
   (a) an electromagnetic wave ring resonator wherein resonant electromagnetic waves propagate through a nonsolid medium;
   (b) means, included in such ring resonator, for spatially rotating the electromagnetic field distribution of the resonant electromagnetic waves as such waves pass through the nonsolid medium about the direction of propagation of such waves to enable the electromagnetic waves in such resonator to resonate with different frequencies; and
   (c) means for producing different phase delays to the electromagnetic waves having the same polarization state propagating in the resonator in opposite directions.

2. The combination recited in claim 1 wherein the rotating means includes a plurality of reflectors arranged to provide a phase difference between circularly polarized electromagnetic waves of opposite polarization senses to enable such waves of opposite polarization senses to resonate in such ring resonator with different frequencies.

3. The combination recited in claim 2 wherein such ring resonator includes an isotropic medium and wherein such rotating means rotates the electromagnetic field distribution of such resonant electromagnetic waves as such waves pass through such isotropic medium.

4. The combination recited in claim 3 wherein such rotating means includes a catoptric system for directing the electromagnetic waves through the isotropic medium.

5. The combination recited in claim 4 wherein a section of such resonant electromagnetic waves is disposed in a first plane and a second section of such resonant electromagnetic waves is disposed in a second, intersecting plane.

6. The combination recited in claim 5 including a nonreciprocal means for establishing four different resonant frequency electromagnetic waves in the ring resonator.

7. The combination recited in claim 6 including a laser amplifier medium disposed in the ring resonator.

8. In combination:
   (a) an electromagnetic wave ring resonator;
   (b) a plurality of reflectors, included in such resonator, for directing electromagnetic waves resonant in such resonator through a predetermined path as such waves pass through a nonsolid medium, one section of such path being disposed in a first plane and a second section of such path being disposed in a second, intersecting plane, such plurality of reflectors being arranged to provide a phase difference between circularly polarized waves of opposite polarization senses to enable such waves of opposite polarization senses to resonate in such resonator with different frequencies; and
   (c) means for producing different phase delays to the electromagnetic waves having the same polarization sense propagating in the resonator in opposite directions.

9. The combination recited in claim 8 wherein such ring resonator includes an isotropic medium and wherein the directing means directs the resonant electromagnetic waves through such isotropic medium.

10. The combination recited in claim 9 wherein such directing means includes a catoptric system.

11. In combination:
    (a) an electromagnetic wave ring resonator;
    (b) a plurality of reflectors, included in such ring resonator, arranged to provide a phase difference between circularly polarized waves of opposite polarization senses to enable such waves of opposite polarization senses to resonate in such resonator with different frequencies; and
    (c) means for providing different phase delays to the electromagnetic waves having the same polarization sense propagating in the resonator in opposite directions.

12. The combination recited in claim 11 wherein such plurality of reflectors directs electromagnetic waves resonant in such ring resonator through a predetermined path, one section of such path being disposed in a first plane and a second section of such path being disposed in a second, intersecting plane.

13. The combination recited in claim 12 wherein such rotating means includes a catoptric system.

14. In combination:
    (a) an electromagnetic wave ring resonator;
    (b) a nonsolid medium disposed in the path of circularly polarized electromagnetic waves resonant in such ring resonator;
    (c) means for altering the electromagnetic field distribution of the waves passing through such nonsolid medium to enable such circularly polarized electromagnetic waves to resonate with different frequencies; and
    (d) means for producing different phase delays to the electromagnetic waves having the same polarization sense propagating in the resonator in opposite directions.

15. In a laser gyroscope wherein a ring resonator is included to support two pairs of circularly polarized waves, the waves of each of such pairs having opposite polarization senses, one of such pairs of waves propagating around the ring resonator in a first direction and the other one of such pairs of waves propagating around such ring resonator in the opposite direction, each one of the waves in the two pairs thereof having a different frequency, the improvement characterized by a plurality of reflectors, included in such ring resonator, arranged to provide a phase difference between waves of opposite polarization senses to enable such waves of opposite polarization senses to resonate at different frequencies; and more for producing different phase delays to the electromagnetic waves having the same polarization sense propagating in the resonator in opposite directions.

16. The improvement recited in claim 15 wherein such ring resonator includes an nonsolid medium and wherein such rotating means rotates the electromagnetic field distribution of such resonant waves as such waves pass through such nonsolid medium.

17. The combination recited in claim 16 wherein such rotating means includes a catoptric system for directing the waves through the nonsolid medium.

18. The combination recited in claim 17 wherein a section of such resonant waves is disposed in a first plane and a second section of such waves is disposed in a second, intersecting, plane.

19. In a laser gyroscope wherein laser waves resonate in a ring resonator, the improvement comprising:
 (a) means, included in such ring resonator, comprising a plurality of reflectors arranged to direct such waves through a predetermined path, one section of such path being disposed in a first plane and a second section of such path being disposed in a second, intersecting plane, such plurality of reflectors being arranged to provide a phase difference between circularly polarized waves of opposite polarization senses to enable such waves of opposite polarization senses to resonate in such resonator at different frequencies; and
 (b) means for providing different phase delays to the electromagnetic waves having the same polarization sense passing around the resonator in opposite directions.

20. The improvement recited in claim 19 wherein such waves pass through an nonsolid medium and wherein such means directs the waves through such medium.

21. In a laser gyroscope wherein laser waves resonate in a ring resonator, the improvement comprising:
 (a) a nonsolid medium disposed in the path of the waves;
 (b) means for spatially rotating the electromagnetic field distribution of such waves about the direction of propagation of such waves as such waves pass through the nonsolid medium to enable electromagnetic waves in such resonator to resonate at different frequencies; and
 (c) means for producing different phase delays to the electromagnetic waves having the same polarization state propagating in the resonator in opposite directions.

22. The improvement recited in claim 21 wherein such rotating means directs the waves through a predetermined path, one section of such path being disposed in a first plane and a second section of such path being disposed in a second, intersecting, plane.

23. The improvement recited in claim 22 wherein the rotating means includes a plurality of reflectors arranged to provide a phase difference between circularly polarized waves of opposite polarization senses to enable such waves of opposite polarization senses to resonate in such resonator with different frequencies.

24. In a laser gyroscope wherein laser waves resonate in a ring resonator, the improvement comprising:
 (a) a nonsolid medium disposed in the path of circularly polarized waves;
 (b) means for altering the electromagnetic field distribution of the waves passing through such nonsolid medium to enable such circularly polarized waves to resonate with different frequencies; and
 (c) means for providing different phase delays to the electromagnetic waves having the same polarization sense passing around the resonator in opposite directions.

* * * * *

UNITED STATES PATENT OFFICE
CERTIFICATE OF CORRECTION

Patent No. 4,110,045   Dated August 29, 1978

Inventor(s) Irl W. Smith, Jr. and Terry A. Dorschner

It is certified that error appears in the above-identified patent and that said Letters Patent are hereby corrected as shown below:

Column 3, line 31, change "$E_1$" to $\vec{E}_1$ ;

line 35, change "$E_1$"" to $\vec{E}_1$: ;

line 40, change "$E_1$" to $\vec{E}_1$ ;

line 42, change "$E_1$'" to $\vec{E}_1$' ;

line 45, change "$E_1$" to $\vec{E}_1$ ;

line 48, change "$E_2$"" to $\vec{E}_2$" ;

line 52, change "$E_2$'''" to $\vec{E}_2$''' ;

line 54, change "$E_2$'" to $\vec{E}_2$' ;

line 55, change "$E_2$" to $\vec{E}_2$ ;

line 59, change "$E_1 ! E_1' = -E_2$" to $\vec{E}_1 \to \vec{E}_1' = -\vec{E}_2$ ;

line 61, change "$E_2 ! E_2' = E_1$" to $\vec{E}_2 \to \vec{E}_2' = \vec{E}_1$ ;

UNITED STATES PATENT OFFICE
CERTIFICATE OF CORRECTION

Patent No. 4,110,045  Dated August 29, 1978

Inventor(s) Irl W. Smith, Jr. and Terry A. Dorschner

It is certified that error appears in the above-identified patent and that said Letters Patent are hereby corrected as shown below:

Column 4, line 38, change "$E_r = [E_1 + E_2 e^{i\pi/2}]e^{-i\omega t}$"

to $\vec{E}_r = [\vec{E}_1 + \vec{E}_2 e^{i\pi/2}]e^{-i\omega t}$ ;

line 43, change "$E_r' = [E_1' + E_2'e^{i\pi/2}]e^{i2\pi L/\lambda}e^{-i\omega t}$ $= [-E_2 + E_1 e^{i\pi/2}]e^{i2\pi L/\lambda}e^{-i\omega t}$ $= e^{i\pi/2} e^{i2\pi L/\lambda} E_r$"

to $\vec{E}_r' = [\vec{E}_1' + \vec{E}_2'e^{i\pi/2}]e^{i2\pi L/\lambda}e^{-i\omega t}$

UNITED STATES PATENT OFFICE
CERTIFICATE OF CORRECTION

Patent No. 4,110,045     Dated August 29, 1978

Inventor(s) Irl W. Smith, Jr. and Terry A. Dorschner

It is certified that error appears in the above-identified patent and that said Letters Patent are hereby corrected as shown below:

Column 4, line 52, change
$$"E_l = [E_1 + E_2 e^{-i\pi/2}]e^{-i\omega t}"$$

to
$$\vec{E}_l = [\vec{E}_1 + \vec{E}_2 e^{-i\pi/2}]e^{-i\omega t} \;;$$

line 57, change
$$"E_l' = [E_1' + E_2' e^{-i\pi/2}]e^{i2\pi L/\lambda} e^{-i\omega t}$$

$$= [-E_2 + E_1 e^{-i\pi/2}]e^{i2\pi L/\lambda} e^{-i\omega t}$$

$$= [-\vec{E}_2 + \vec{E}_1 e^{i\pi/2}]e^{i2\pi L/\lambda} e^{-i\omega t}$$

$$= e^{i\pi/2} e^{i2\pi L/\lambda} \vec{E}_r \;;$$

UNITED STATES PATENT OFFICE
CERTIFICATE OF CORRECTION

Patent No. 4,110,045    Dated August 29, 1978

Inventor(s) Irl W. Smith, Jr. and Terry A. Dorschner

It is certified that error appears in the above-identified patent and that said Letters Patent are hereby corrected as shown below:

$$\text{to } \vec{E}_\ell{}' = [\vec{E}_1{}' + \vec{E}_2{}' e^{-i\pi/2}] e^{i2\pi L/\lambda} \vec{E}_\ell{}''$$

$$= [-\vec{E}_2 + \vec{E}_1 e^{-i\pi/2}] e^{i2\pi L/\lambda} e^{-i\omega t}$$

$$= e^{-i\pi/2} e^{i2\pi L/\lambda} \vec{E}_\ell \quad ;$$

Column 5, line 15, change "$E_r = R_e [e_R] = X \cos(\beta S - \omega t) - Y \sin(\beta S - \omega t)$"

UNITED STATES PATENT OFFICE
CERTIFICATE OF CORRECTION

Patent No. 4,110,045　　　　　　　　Dated August 29, 1978

Inventor(s) Irl W. Smith, Jr. and Terry A. Dorschner

It is certified that error appears in the above-identified patent and that said Letters Patent are hereby corrected as shown below:

$$\text{to } \hat{E}_r = R_e [\hat{e}_R]$$
$$= \hat{X} \cos(\beta S - \omega t) - \hat{Y} \sin(\beta S - \omega t) ;$$

Column 5, line 17, change "X, Y and Z" to $\hat{X}, \hat{Y}$ and $\hat{Z}$ ;

line 36, change "$E_r' = Re[e_R']$
$$= X \cos(\beta S - \omega t + \pi/2) - Y \sin(\beta S - \omega t + \pi/2)"$$

$$\text{to } \hat{E}_R' = Re[\hat{e}_R'] = \hat{X} \cos(\beta S - \omega t + \pi/2)$$
$$-\hat{Y} \sin(\beta S - \omega t + \pi/2) ;$$

UNITED STATES PATENT OFFICE
CERTIFICATE OF CORRECTION

Patent No. 4,110,045          Dated August 29, 1978

Inventor(s) Irl W. Smith, Jr. and Terry A. Dorschner

It is certified that error appears in the above-identified patent and that said Letters Patent are hereby corrected as shown below:

Column 5, line 51, change "$F_l' = c/2\pi L\ (2n\pi + \pi/2)$"

to $f_\ell' = c/2\pi L\ (2n\pi + \pi/2)$ ;

Column 6, line 57, change "G" to $\vec{G}$ ; (both occurrences)

line 60, change "$G = \oint r \times dr$"

to $\vec{G} = \oint \vec{r} \times d\vec{r}$ ;

line 62, change "dr" to $d\vec{r}$ ;

line 63, change "r" to $\vec{r}$ ;

Column 7, line 2, change "G" to $\vec{G}$ ;

line 4, change "$G_1 = [+A_1 Y - A_2 Z]$"

to $\vec{G}_1 = [+A_1 \vec{Y} - A_2 \vec{Z}]$ ;

UNITED STATES PATENT OFFICE
CERTIFICATE OF CORRECTION

Patent No. 4,110,045          Dated August 29, 1978

Inventor(s) Irl W. Smith, Jr. and Terry A. Dorschner

It is certified that error appears in the above-identified patent and that said Letters Patent are hereby corrected as shown below:

Column 7, line 51, change "$\Gamma$" to $\hat{\Gamma}$ ;

line 56, change "$n_1$ and $n_2$" to $\hat{n}_1$ and $\hat{n}_2$ ;

line 58, change "$\Gamma \sin\gamma = n_1 \times n_2$" to $\hat{\Gamma} \sin\gamma = \hat{n}_1 \times \hat{n}_2$ ;

line 68, change "$\Gamma$" to $\hat{\Gamma}$ ;

Column 10, line 65, change "more" to means ;

Signed and Sealed this

Eleventh Day of December 1979

[SEAL]

Attest:

SIDNEY A. DIAMOND

Attesting Officer     Commissioner of Patents and Trademarks